United States Patent
Nickel et al.

(10) Patent No.: US 9,610,911 B2
(45) Date of Patent: Apr. 4, 2017

(54) FRONT PART OF A MOTOR VEHICLE AND STIFFENING THERETO

(71) Applicant: GM GLOBAL TECHNOLOGY OPERATIONS LLC, Detroit, MI (US)

(72) Inventors: Marco Nickel, Riedstadt (DE); Theobald Hock, Grossostheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 14/925,449

(22) Filed: Oct. 28, 2015

(65) Prior Publication Data

US 2016/0121828 A1 May 5, 2016

(30) Foreign Application Priority Data

Oct. 29, 2014 (DE) .................. 10 2014 016 044

(51) Int. Cl.
*B60R 19/12* (2006.01)
*B60R 19/18* (2006.01)

(52) U.S. Cl.
CPC .............. *B60R 19/18* (2013.01); *B60R 19/12* (2013.01); *B60R 2019/1873* (2013.01)

(58) Field of Classification Search
CPC ......... B60R 19/18; B60R 19/12; B60R 19/24; B60R 2019/184; B60R 2021/0053
USPC ....................................................... 293/142
See application file for complete search history.

(56) References Cited

U.S. PATENT DOCUMENTS

| | | | |
|---|---|---|---|
| 3,869,167 A | 3/1975 | Muller | |
| 4,988,137 A | 1/1991 | Fleming | |
| 5,577,784 A | 11/1996 | Nelson | |
| 5,967,592 A | 10/1999 | Freeman | |
| 6,245,415 B1 | 6/2001 | Keller et al. | |
| 6,406,079 B2 | 6/2002 | Tamada et al. | |
| 6,511,109 B1 | 1/2003 | Schultz et al. | |
| 6,672,635 B2 | 1/2004 | Weissenborn et al. | |
| 6,890,011 B2 | 5/2005 | Arvelo et al. | |
| 6,997,490 B2 | 2/2006 | Evans et al. | |
| 7,131,674 B2 | 11/2006 | Evans et al. | |
| 7,560,003 B2 | 7/2009 | Naughton et al. | |
| 7,651,155 B2 | 1/2010 | Tan et al. | |
| 7,879,435 B2 | 2/2011 | Mett et al. | |
| 7,887,121 B2 * | 2/2011 | Hasegawa | B60R 19/18 293/132 |

(Continued)

FOREIGN PATENT DOCUMENTS

| | | |
|---|---|---|
| DE | 10354723 A1 | 6/2005 |
| DE | 102005056961 A1 | 6/2007 |

(Continued)

OTHER PUBLICATIONS

German Patent Office, German Search Report for German Application No. 102014016044.0, dated Jun. 26, 2015.

(Continued)

*Primary Examiner* — Pinel Romain
(74) *Attorney, Agent, or Firm* — Lorenz & Kopf, LLP

(57) ABSTRACT

A bumper stiffener includes at least one rib projecting from a first major face of the plate and extending in the direction of an impact to be absorbed by the shock absorber stiffener. The compressive strength in longitudinal direction of the rib is higher at its ends than in its middle.

16 Claims, 3 Drawing Sheets

(56) References Cited

U.S. PATENT DOCUMENTS

| | | | |
|---|---|---|---|
| 8,449,021 B2 * | 5/2013 | Mana | B60R 19/12 293/120 |
| 8,579,080 B2 | 11/2013 | Angelico | |
| 9,132,793 B2 | 9/2015 | Nickel et al. | |
| 2004/0017089 A1 | 1/2004 | Hunter et al. | |
| 2006/0097539 A1 | 5/2006 | Noisternig et al. | |
| 2007/0046043 A1 * | 3/2007 | Ito | B60R 19/18 293/120 |
| 2007/0046044 A1 * | 3/2007 | Tanabe | B60R 21/34 293/120 |
| 2008/0001433 A1 | 1/2008 | Noyori et al. | |
| 2008/0093868 A1 * | 4/2008 | Steller | B60R 19/18 293/142 |
| 2008/0296164 A1 | 12/2008 | Dajek et al. | |
| 2009/0267369 A1 | 10/2009 | Hasegawa et al. | |
| 2012/0141764 A1 | 6/2012 | Lee et al. | |
| 2013/0119705 A1 | 5/2013 | Matuschek et al. | |

FOREIGN PATENT DOCUMENTS

| | | |
|---|---|---|
| DE | 202009017309 U1 | 3/2010 |
| DE | 102011109180 A1 | 2/2012 |
| DE | 102010037462 A1 | 3/2012 |
| DE | 102011107995 A1 | 1/2013 |
| DE | 102012013692 A1 | 1/2013 |
| EP | 1564088 A1 | 8/2005 |
| EP | 1997689 A1 | 12/2008 |
| FR | 2898566 A1 | 9/2007 |
| JP | S62149537 A | 7/1987 |
| JP | 2013056604 A | 3/2013 |
| WO | 03104030 A2 | 12/2003 |

OTHER PUBLICATIONS

Beyene, Koricho, Belingardi, Martorana, Design and Manufacturing Issues in the Development of Lightweight Solution for a Vehicle Frontal Bumper, International Symposium on Dynamic Response and Failure of Composite Materials DRaF2014, 2014, Elsevier Ltd. Beyene, Koricho, Belingardi, Martorana, Politecnico di Torino, Department of Mechanical and Aerospace Engineering, ICILLS 2014, Cape Town, Jan. 12-16, 2014. pp. 1-4.

* cited by examiner

FRONT PART OF A MOTOR VEHICLE AND STIFFENING THERETO

CROSS-REFERENCE TO RELATED APPLICATION

This application claims priority to German Patent Application No. 102014016044.0, filed Oct. 29, 2014, which is incorporated herein by reference in its entirety.

TECHNICAL FIELD

The present disclosure pertains to a front part of a motor vehicle, in particular a bumper stiffener thereto.

BACKGROUND

If a pedestrian were to collide with a motor vehicle, it is preferred that the head of the pedestrian impact on a front hood of the motor vehicle, since the latter can yield under the impact, thereby catching the head relatively carefully. In order for this to succeed, the pedestrian must not be simply thrown over by the vehicle but his legs have to be pushed away under the torso so that the same can fall onto the front hood.

DE 10 2013 002 307 discloses a front part of a motor vehicle, in which a plate-like bumper stiffener extends between the lower region of a bumper covering and an auxiliary frame. When during a collision with a pedestrian the bumper stiffener strikes the lower legs of the pedestrian, it is initially elastically deformed, but subsequently springs back into its rest position in the process pushing the lower legs away from it in travelling direction. Since the torso of the pedestrian is substantially less accelerated at the same time, it topples onto the hood from the top. The bumper stiffener is curved in vehicle longitudinal direction. This prevents sudden non-reproducible collapsing of the bumper stiffener under load but on the other hand also requires a thick wall of the bumper stiffener for reaching a predetermined deformation resistance. In addition, the curved bumper stiffener requires substantial space in vertical direction which cannot be easily satisfied since the bumper stiffener on the one hand has to be accommodated under a cooling module but on the other hand has to be located high enough so as not to strike a curb stone when driving up against such.

Through the possibility of ribbing of the curved bumper stiffener described in DE 10 2013 002 307 a higher stiffness and thus a lower use of material can be achieved. However, pending the ribs yielding locally, a high initial resistance has to be overcome. Since the further deformation behavior depends on the place in which the rib has started to yield, the reproducibility of the deformation is limited.

SUMMARY

In accordance with the present disclosure a bumper stiffener for a front part of a motor vehicle is provided which has a reproducible elastic deformation behavior and can be realized with lower material expenditure. In a configuration of the present disclosure, a plate-like bumper stiffener is provided with at least one rib standing away from a first main surface of the plate and extending in the direction of an impact to be absorbed by the bumper stiffener. The compressive strength in longitudinal direction of the rib is higher at its ends than in its middle. Since no curvature of the bumper stiffener is required any longer, it can be integrated in the vehicle front in a space saving manner.

When the bumper stiffener is loaded by an impact, the ribs start to yield at their weakest point, in the middle. The bumper stiffener therefore always bends through in the same place and the force required for this is reproducible. When the plate-like bumper stiffener is embodied as apart that is linear in vehicle longitudinal direction a preferred deformation resistance can be attained with a smaller wall thickness than with the bumper stiffener that is curved in vehicle longitudinal direction described above.

The compressive strength of the at least one rib can continuously vary at least over and beyond its middle, preferably over its entire length. By sudden changes of the compressive strength being avoided, in particular in that at the place of minimal compressive strength of the at least one rib the dependency of the compressive strength on the location disappears, and concentration of the strain in the event of a collision on too narrow a region, which could lead to plastic deformation, can be avoided and good rebound behavior of the bumper stiffener achieved. In order to vary the compressive strength along the rib, the width of the at least one rib can be smaller in the middle than at its ends. The wall thickness of the at least one rib can also be smaller in the middle than at the ends of the ribs. The height of the at least one rib can also be smaller in the middle than at the ends of the rib. The at least one rib can have a rectangular cross section.

On a second main surface of the plate, a channel can be formed which engages in the rib no that a hollow rib is obtained. This bumper stiffener with hollow ribs can be produced according to the deep-drawing method.

A web extending in the direction of the impact can project into the channel for reinforcement. In order to create a lower compressive strength in the middle of the rib, the web can have a greater height and/or width at the ends of the rib than in its middle.

The bumper stiffener can also be produced according to the injection molding method or according to the compression molding method, the compression molding method being particularly suitable when the ribs have different wall thicknesses. When the bumper stiffener comprises webs or non-hollow ribs, the injection molding method is preferred.

On a rear outer edge running transversely to the direction of the impact, the bumper stiffener can comprise a flange for fastening to a load-bearing body part of a motor vehicle. The flange can extend surface-flush with the plate. The bumper stiffener can comprise a bending zone between the flange and the at least one rib.

In a configuration of the present disclosure, a front part for a motor vehicle with a bumper covering and the bumper stiffener as described above is provided. The bumper stiffener extends in vehicle longitudinal direction between the bumper covering and a load-carrying body part and the first main surface of the bumper stiffener faces upwards. Since the at least one rib projecting upwards starts yielding in the middle during the impact loading, the deflection of the bumper stiffener reproducibly occurs downwards into the free space under the motor vehicle. It is thereby ensured that the deflection is not obstructed by parts of the vehicle such as for example a radiator located above the bumper stiffener.

The flange of the bumper stiffener can be fastened to the bottom side of the load-carrying body part. Because of this, the ribs, which project upwards from the plate, can vertically overlap with the load-carrying body part and support themselves on it in the event of an impact. The bumper stiffener can engage in a groove of the bumper covering in order to prevent the front edge of the bumper stiffener giving way in vertical direction in the event of an impact. The at least one rib can reach as far as into the bumper covering.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
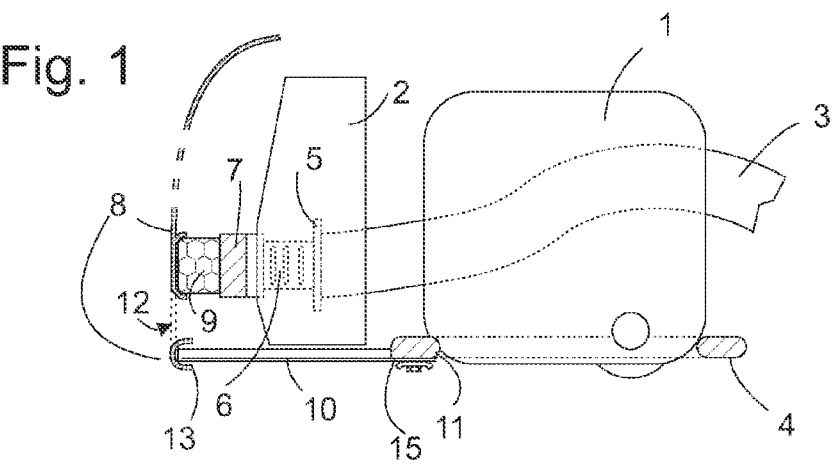
FIG. 1 is a schematic longitudinal section through a front part of a motor vehicle.

FIG. 1 shows a front part of a motor vehicle in a schematic longitudinal section. In the engine compartment of the vehicle, a motor 1 and a radiator 2 are located in the usual manner. The engine compartment is flanked by side members 3 on each side, which are connected among themselves into a rigid frame. An auxiliary frame 4 supporting the engine 1 is also releasably fastened to this frame in a dampened manner.

The side members 3 at their front ends are provided with flanges 5, on which an upper member cross member 7 is fastened via crash boxes 6. An intermediate space between the front side of the bumper cross member 7 and a bumper covering 8 is filled out by a buffer body 9 of foam material. The bumper covering 8 has an air inlet opening 12 below the bumper cross member 7. Below the air inlet opening 12, the bumper covering 8 is formed as a U-shaped hollow profile with a groove 13 that is open towards the auxiliary frame 4, in which a front edge of a plate-like bumper stiffener 10 engages. The bumper stiffener 10 extends under the radiator 2 as far as up to a front cross member 11 of the auxiliary frame 4, on which it is secured, preferably by a threaded connection.

Figure 2:
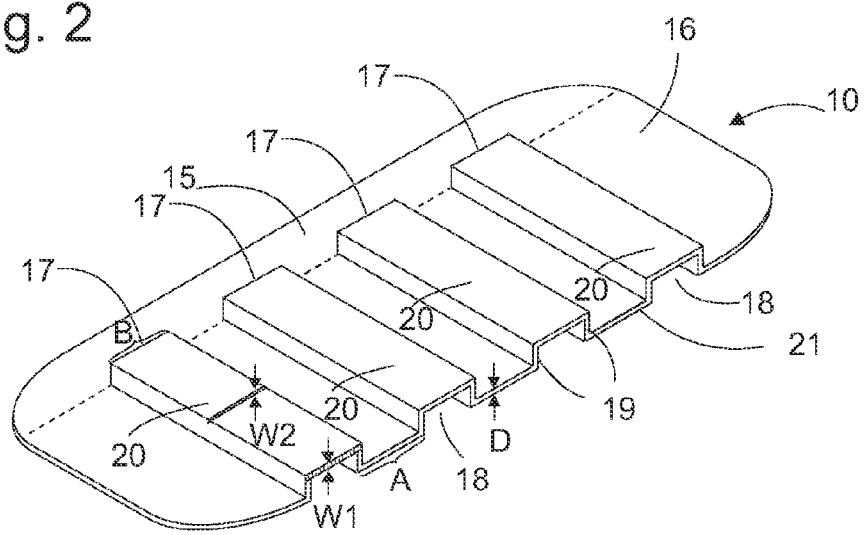
FIG. 2 is a view of the bumper stiffener according to a first configuration of the present disclosure.

FIG. 2 shows the bumper stiffener 10 of a first configuration in a perspective view. Ribs 17 project from the top side of a planar element or plate 16. The ribs 17 in this case are hollow, i.e. channels 18 are recessed on the bottom side of the plate 16, which engage in the ribs 17. The ribs in this case have a rectangular cross section, with two side walls 19 and a cover wall 20. The ribs 17 extend in vehicle longitudinal direction from a front edge as far as to a rear edge of the plate 16. The rear edge of the plate 16 is followed by a flange 15 which runs surface-flush with the plate 16. As shown in FIG. 1, the flange 15 of the bumper stiffener 10 is fastened to the lower side of the auxiliary frame 4. Rear ends of the ribs 17 of the bumper stiffener 10 abut the cross member 11.

The width B of the ribs 17 is as large as the distance A between two side walls 19 of adjacent ribs 17 located opposite one another. The wall thickness of the cover wall 20 continuously decreases or tapers from W1 at the ends of the ribs 17 to a wall thickness W2 in the middle of the ribs 17. When through the impact during a collision the bumper stiffener 10 is exposed to compressive loading in longitudinal direction of the ribs 17, the deformation starts in a region with the highest compressive load. Because of the lower wall thickness, this region lies in the middle of the cover walls 20. For this reason, a compression of the cover walls 20 in the middle of the ribs 17 occurs. The bumper stiffener 10 reproducibly commences bending through downwards in the middle of the ribs 17. The initial resistance up to the start of the deflection can be influenced by selecting the wall thickness W2 in the middle of the ribs 17.

Upon unloading after impact, the bumper stiffener 10 should have a favorable rebound behavior under the expected compressive loading. To this end, the wall thickness of the cover wall 20 continuously decreases from the ends towards the middle of the ribs 17. In addition it is practical to select the thickness D of the plate 16 greater than the wall thickness W of the cover wall 20. Because of the different wall thicknesses of the ribs 17, the bumper stiffener 10 is advantageously produced according to the compression molding method.

Figure 3:
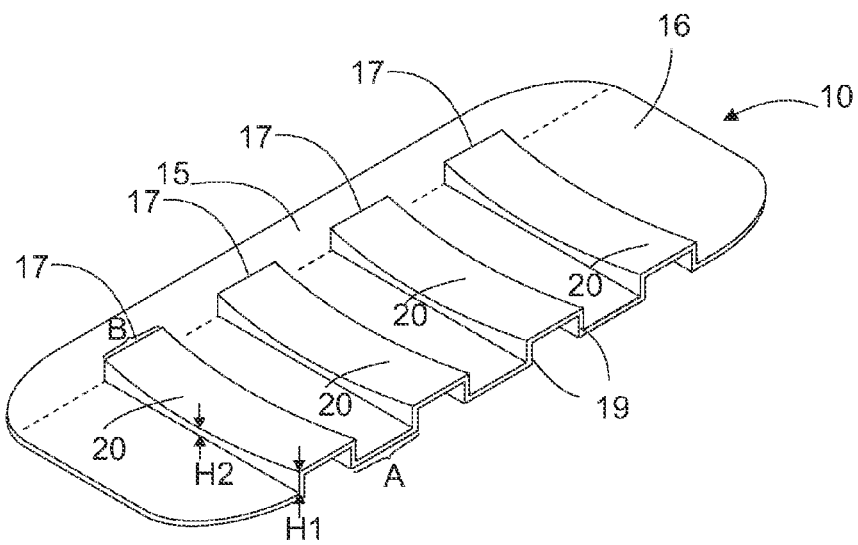
FIG. 3 is a view of the bumper stiffener according to a second configuration of the present disclosure.

In the second exemplary embodiment shown in FIG. 3, the height of the ribs 17, starting out from a value H2 in its middle, continuously increases to a value H1 at their ends. The wall thickness of the cover wall 20 and of the side walls 19 by contrast can be constant over the length. It is thereby ensured that the deflection through of the bumper stiffener 10 during a collision reproducibly commences in the middle of the rib 17 and the bumper stiffener 10 has a good rebound behavior. The bumper stiffener 10 in the second exemplary embodiment is, because of the constant wall thickness, advantageously produced according to the deep-drawing method.

Figure 4:
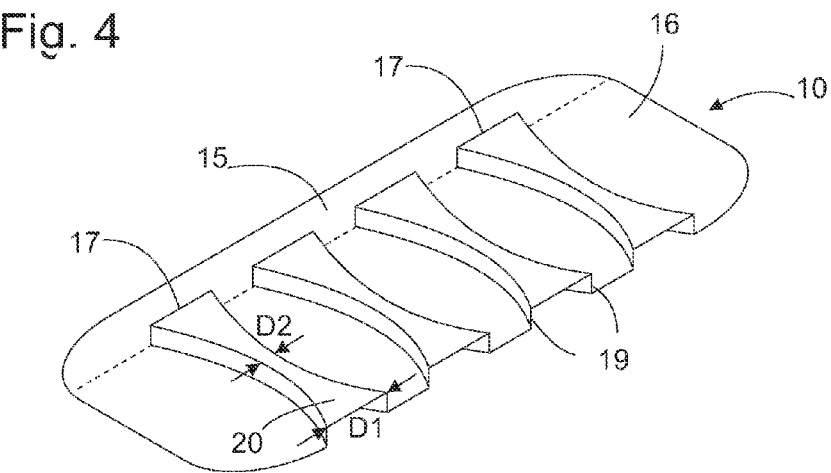
FIG. 4 is a view of the bumper stiffener according to a third configuration of the present disclosure.

In the third exemplary embodiment shown in FIG. 4, the width D2 of the ribs 17 continuously increases starting out from their middle to the width D1 at their ends. During a collision, this also reproducibly leads to a start of the deflection of the bumper stiffener 10 in the middle of the ribs 17 and to a good rebound behavior. Because of the constant wall thickness, the bumper stiffener 10 in the third exemplary embodiment is advantageously produced according to the deep-drawing method.

Figure 5:
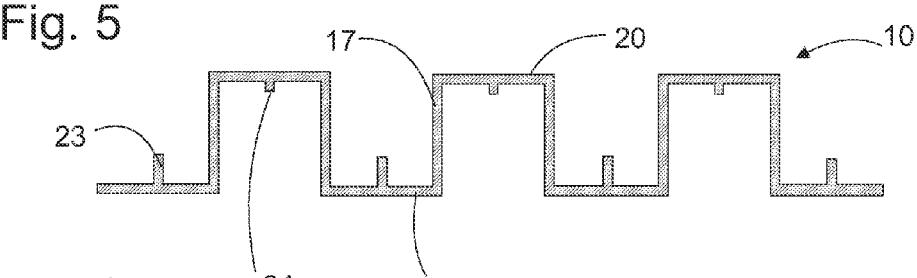
FIG. 5 is a schematic cross section of the bumper stiffener according to a fourth configuration of the present disclosure.

FIG. 5 shows for a fourth exemplary embodiment a cross member through the bumper stiffener 10 in the rib middle with solid ribs 23, which in longitudinal direction project upwards from the plate 16 between the hollow ribs 17. On the bottom side of their cover walls 20, the ribs 17 comprise webs for stiffener. The webs 24, just like the ribs 17 in the second and third exemplary embodiment can vary in height and width from the middle to their ends in order to reduce the compressive strength in the middle of the ribs. During a collision, this likewise reproducibly leads to a start of the deflection of the bumper stiffener 10 in the middle of the ribs 17 and a good rebound behavior. The bumper stiffener 10 in the fourth exemplary embodiment is advantageously produced according to the injection molding method because of the solid ribs 23 and the ribs 24.

Figure 6:
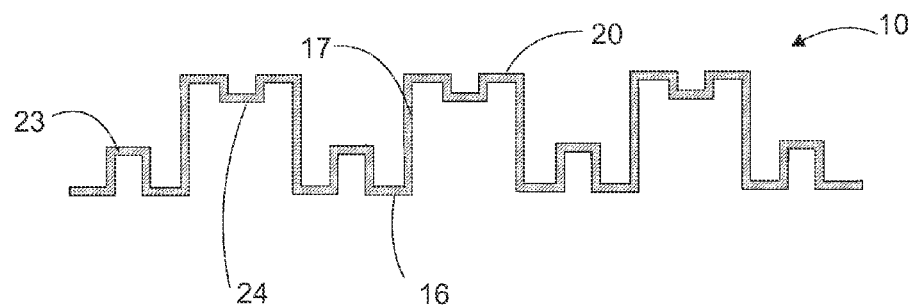
FIG. 6 is a schematic cross section of the bumper stiffener according to a fifth configuration of the present disclosure.

In a fifth exemplary embodiment, the ribs 23, as shown in FIG. 6 in cross section through the bumper stiffener 10 in the rib middle, are embodied as further hollow ribs. The webs 24 are embodied as hollow webs which from the cover wall 20 of the ribs 17 face downwards. The hollow webs 24, like the ribs 17 in the second and third exemplary embodiment, can vary in height and width from the middle to their ends in order to reduce the compressive strength in the middle of the ribs 17. In the event of a collision, this likewise reproducibly leads to a start of the deflection of the bumper stiffener 10 in the middle of the ribs 17 and good rebound behavior. The bumper stiffener 10 in the fifth exemplary embodiment is advantageously produced according to the deep-drawing method because of the constant wall thickness.

Figure 7:
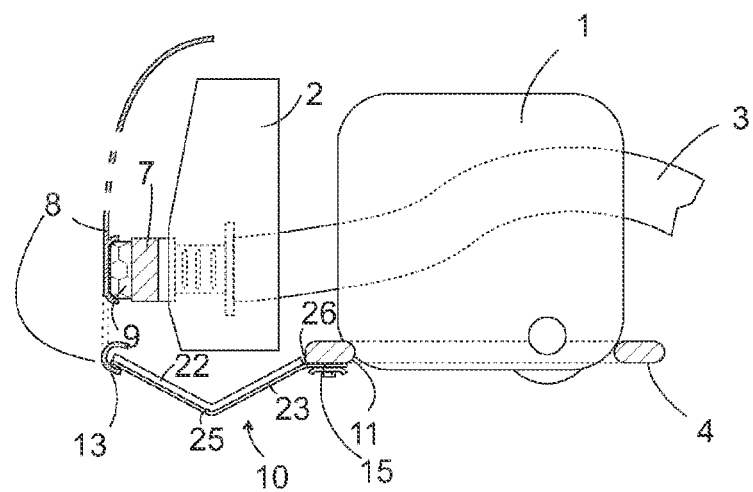
FIG. 7 shows the front part from FIG. 1 in the elastically deformed state.

FIG. 7 shows the front part from FIG. 1 in a deformed state during the collision with a pedestrian. The buffer body 9 is compressed and the bumper covering 8 forced back so that the distance between it and the auxiliary frame 4 is reduced. Because of this, the bumper stiffener 10 is forced to give way. Since the ribs projecting upwards from the plate 16 are more resilient than the plate 16, the bumper stiffener 10 gives way towards the bottom, wherein between relatively slightly deformed front and rear regions 22, 23 a downward convex deformation zone 25 and between the rear region 23 and the flange 15 a bending zone 26 that is curved opposite to the deformation zone 25 are formed. While the compression of the buffer body 9 is not yet completely concluded, the bumper stiffener 10 has reached the maximum of its elastic deformation here and starts to again rebound towards the front. While thigh and knee of the pedestrian can thus still further impress into the bumper covering 8, the lower leg is already pushed away again and a pivot movement of the legs of the pedestrian is driven, which significantly reduces the loading of knees and leg bones of the pedestrian when striking the engine hood.

The deformation zone 25 is tightly limited in FIG. 7 in vehicle longitudinal direction in order to illustrate the region of the start of the deformation. In principle, even deflection with a wide deformation zone 25 is aimed at in order to obtain a good rebound behavior. This is achieved in that in the place of minimal compressive strength of each rib 17 the dependency of the compressive strength on the location disappears. In other words, when the compressive strength is reached by a variable wall thickness of the rib 17 the derivation of the wall thickness at the place of minimal wall thickness according to the location coordinate in vehicle longitudinal direction is also zero, in the case of variable width the same is locally constant about the location of minimal width. The location of minimal wall thickness is therefore deformable only infinitesimally more easily deformable than regions of the ribs located in vehicle longitudinal direction in front of or behind the same, no that sharp boundaries between the deformation zones 25 and the regions 22, 23 do not exist, the deformation is distributed in vehicle longitudinal direction and local overloading is avoided.

The smaller the variation of the compressive strength in the surroundings of the minimum is, the further can the location, in which a rib starts to give way, deviate from an exact geometrical center point in the case of a single collision. A practical compromise between elasticity and reproducibility of the deformation behavior therefore has to be individually determined for each vehicle model respectively its bumper stiffener.

Figure 8:
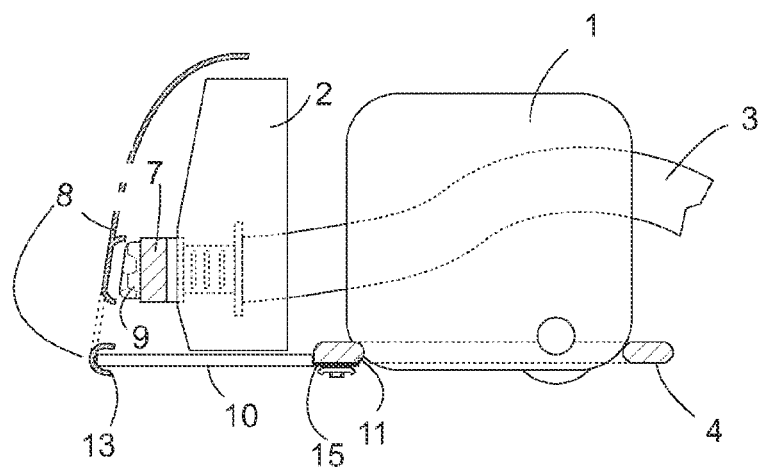
FIG. 8 shows the front part from FIG. 1 following elastic deformation.

FIG. 8 shows the front part with bumper cross member 14 already moved forward again into the starting position. The buffer body 9 is plastically deformed and not yet expanded again. The buffer body 9 may include a hard foam which with small deformations behaves elastically but is irreversibly deformed through the loads that occur in the case of a pedestrian collision. Preferred, however, is a foam material of higher elasticity, for example an EPP foam, which even following major deformations, such as can occur during a pedestrian collision, can return into its original form, but which does so slowly so that it has no rebound behavior worth mentioning during the collision in contrast with the bumper stiffener 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A bumper stiffener for absorbing an impact comprising a plate element defining a major face and at least one rib projecting from the major face and extending in a direction of the impact, each rib including a first end region having a first compressive strength, a second end region having a second compressive strength and a middle region disposed between the first and second end region and having a third compressive strength, wherein the third compressive strength is less than the first compressive strength and the second compressive strength such that the bumper stiffener is configured to buckle in the middle region under an impact force, and wherein a width of the rib in the middle region is less than the width of the rib in the first or second end regions.

2. The bumper stiffener according to claim 1 further comprising a plurality of ribs projecting from the major face.

3. The bumper stiffener according to claim 1, wherein the compressive strength of the rib is dependent upon its location on the bumper stiffener, and wherein the dependency of the compressive strength on the location disappears at a location of minimal compressive strength.

4. The bumper stiffener according to claim 1, wherein a wall thickness of the rib in the middle region is less than the wall thickness in the first or second end regions.

5. The bumper stiffener according claim 1, wherein a wall height of the rib in the middle region is less than the wall height in the first or second end regions.

6. The bumper stiffener according to claim 1, wherein the rib defines a channel formed in a surface of the plate element opposite the major face.

7. The bumper stiffener according to claim 6, further comprising a web extending in the direction of the impact and projecting into the channel.

8. The bumper stiffener according to claim 6, wherein the bumper stiffener comprises a deep-drawn part.

9. The bumper stiffener according to claim 1, wherein the bumper stiffener comprises a molded part.

10. The bumper stiffener according to claim 1, further comprising a flange formed on a rear outer edge of the plate element running transversely to the direction of the impact.

11. The bumper stiffener according to claim 10, wherein the flange runs surface-flush with the plate element.

12. The bumper stiffener according to claim 10, wherein a bending zone is formed between the flange and the rib.

13. A front part for a motor vehicle comprising a body structure, a bumper cover, and a bumper stiffener according to claim 1, wherein the bumper stiffener is disposed between the body structure and the bumper cover and extends in a vehicle longitudinal direction there between such that the major face is directed upwardly.

14. The front part for a motor vehicle according to claim 13, wherein the bumper stiffener further comprises a flange formed on a rear outer edge of the plate element running transversely to the direction of the impact, wherein the flange is fastened to a bottom side of the body structure.

15. The front part for a motor vehicle according to claim 13, wherein the bumper cover has a groove formed therein and the bumper stiffener engages in the groove such that the rib extends into the bumper cover.

16. A bumper stiffener for absorbing an impact comprising a plate element defining a major face and at least one rib projecting from the major face and extending in a direction of the impact, each rib including a first end region having a first compressive strength, a second end region having a second compressive strength and a middle region disposed between the first and second end region and having a third compressive strength, wherein the third compressive strength is less than the first compressive strength and the second compressive strength such that the bumper stiffener is configured to buckle in the middle region under an impact force, and wherein a wall height of the rib in the middle region is less than the wall height in the first or second end regions.

* * * * *